Oct. 26, 1954 M. H. KOWAL 2,692,700

BOTTLE CARRIER

Filed June 16, 1948 5 Sheets-Sheet 1

Inventor
Michael H. Kowal
By Wallace and Cannon
Attorneys

Oct. 26, 1954

M. H. KOWAL 2,692,700

BOTTLE CARRIER

Filed June 16, 1948

5 Sheets-Sheet 2

Inventor
Michael H. Kowal
By Wallace and Cannon
Attorneys

Inventor
Michael H. Kowal
By Wallace and Cannon
Attorneys

Oct. 26, 1954 M. H. KOWAL 2,692,700

BOTTLE CARRIER

Filed June 16, 1948 5 Sheets-Sheet 4

Inventor
Michael H. Kowal
By Wallace and Cannon
Attorneys

Inventor
Michael H. Kowal
By Wallace and Cannon
Attorneys

Patented Oct. 26, 1954

2,692,700

UNITED STATES PATENT OFFICE 2,692,700

BOTTLE CARRIER

Michael H. Kowal, Clifton, N. J., assignor to Empire Box Corporation, Garfield, N. J., a corporation of Delaware Application June 16, 1948, Serial No. 33,368

9 Claims. (Cl. 220—113)

This invention relates to bottle carriers and particularly to pre-formed collapsible bottle carriers made from cardboard or like sheet material.

In bottle carriers of the aforesaid character, it has been quite common to form such carriers from cardboard or like sheet material and to so form and arrange the elements of such carriers that they may be manufactured and shipped in a flat or collapsed form and may be erected at the time when bottles are to be loaded therein.

Such bottle carriers have taken many different forms, and in attaining the collapsible characteristic without sacrifice of cardboard material, it has been found that the resulting carriers are in many instances made up of weight supporting members that are of relatively small cross sectional area so that the carriers do not stand up well in use. This has in effect limited the useful life of many such bottle carriers to a single use or bottle carrying trip, and as a practical matter it is desirable in bottle carriers of this general character to attain a structure which will function in several bottle carrying trips. This not only reduces the ultimate cost of such carriers, but also is a marked convenience to the purchaser since he may make use of the carrier in storing as well as in returning the empty bottles to the store.

Another characteristic that is highly desirable in collapsible bottle carriers made from cardboard or like material is the attainment of a small or minimum overall dimension in the carrier insofar as the plan-form may be concerned, for the attainment of such a small size in plan-form enables such bottle carriers to be disposed in the bottle carrying cases of conventional size. In many instances, such carriers are mounted in the case and are then loaded by conventional case loading machinery, and in addition to the attainment of the small plan-form, it is desirable where case loading machinery is to be thus used, to have the bottle separating and enclosing walls normally disposed in a vertical position so that the bottle loading or inserting operations may be performed without deforming or bending of the cardboard material.

Bottle carriers have in the past been constructed so as to accomplish the above described advantageous functions, but in attaining such narrow walls and bottle separating elements between the several bottle receiving spaces, it has been necessary to resort either to angularly extended bottle separating arms or webs, or to resort to a stepped relationship of the webs so that the carrier is not of a symmetrical form. In other instances where efforts have been made to avoid the use of angular arms or webs, or the necessity for such a stepped arrangement, resort has been had to different two-piece constructions which were difficult and costly to manufacture.

In view of the foregoing, it is the primary object of the present invention to enable the desirable characteristics above discussed to be attained in a pre-formed collapsible bottle carrier that is simple and economical in its construction, and which is quite rugged in its structural characteristics so as to enable the carrier to be used on several bottle transporting trips. More specifically, it is an object of the present invention to enable such a pre-formed collapsible bottle carrier to be made from a single one-piece blank without the necessity for utilizing angularly related bottle separating elements and without employing complicated structure for affording the bottle separating webs or straps.

It is also an important object of the present invention to enable the primary elements of the handle in such a pre-formed collapsible bottle carrier to be disposed above the level of the major portion of the side walls of the carrier, and a related object is to afford a simple and rugged weight transmitting connection between the end portions of such a handle and the end walls or panels of such a carrier.

Other and further objects of the present invention are to afford a bottle carrier of the kind wherein the handle section is offset laterally from the side wall sections of the blank when the carrier is in its collapsed relation, and to enable this to be accomplished in a structure wherein the weight or force transmission through the elements of the carrier places only those elements under substantial stress that are of a relatively heavy and rugged construction. More specifically, it is an object of the present invention to enable a carrier in which vertically disposed bottle separating elements extend in a horizontal direction and in which the handle section is offset laterally from the side walls when the carrier is collapsed, to be constructed from a single one-piece blank merely through the performance of a series of cutting, folding and gluing or other fastening operations.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 9:
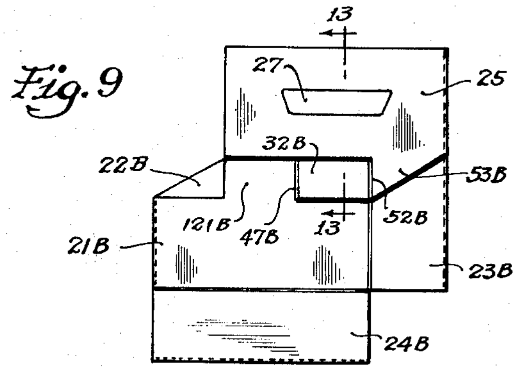
Figure 10:
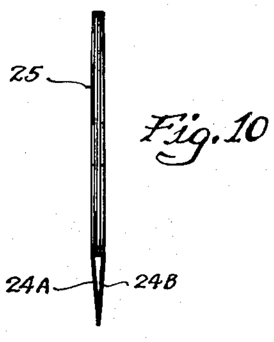
Figure 11:
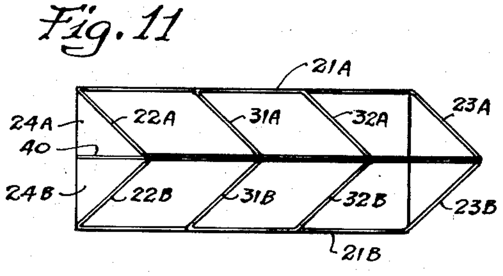
Figure 12:
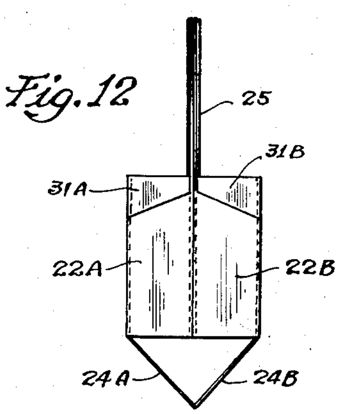
Figure 13:
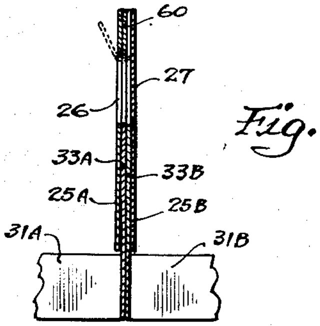
Figure 13A:
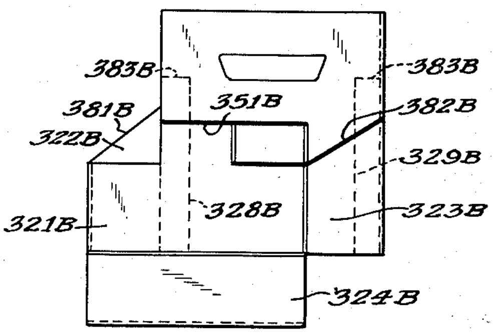
Figure 14:
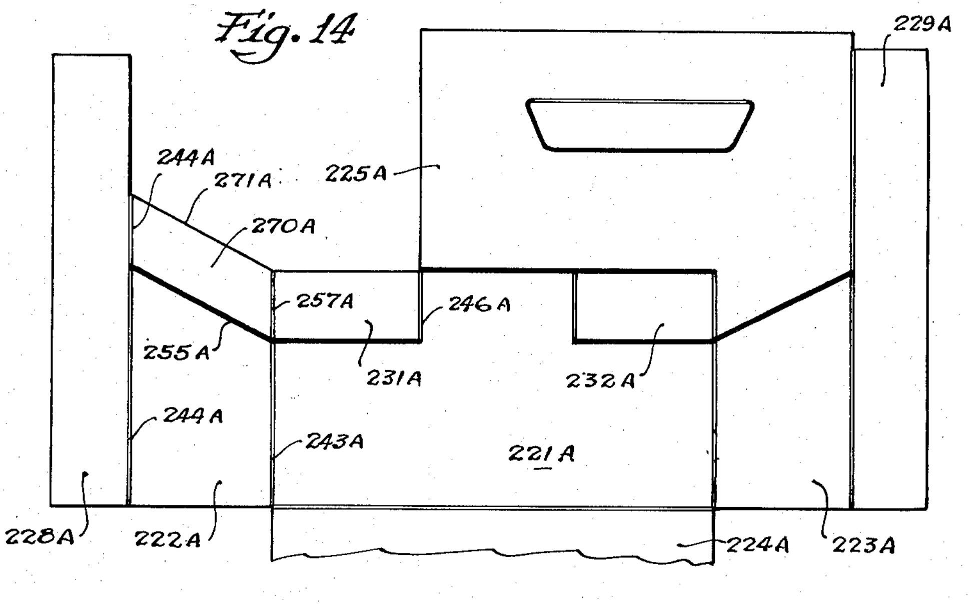
Figure 15:
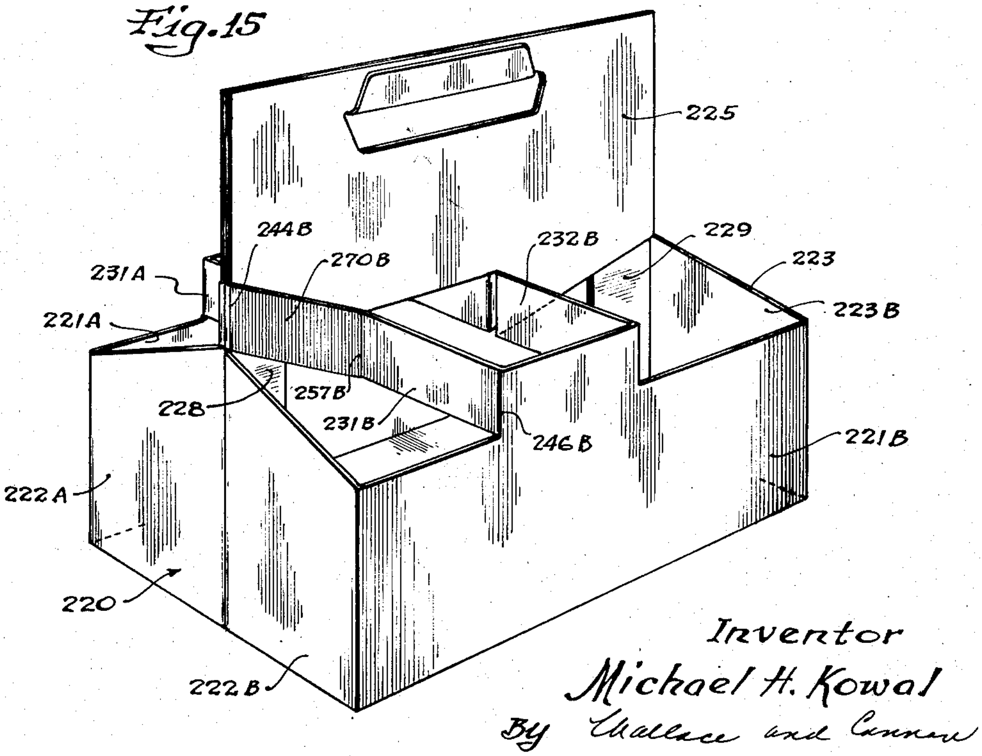

Figs. 5 to 8, inclusive, are views of the blank showing the successive folding and gluing steps that are performed in the construction of the carrier;

Fig. 9 is a face view of the carrier in its collapsed relationship;

Fig. 10 is an end view of the carrier in its collapsed relation;

Fig. 11 is a plan view of the carrier in a partially erected condition;

Fig. 12 is an end view of the carrier in the same partially erected condition;

Fig. 13 is a fragmentary vertical sectional view taken substantially along the line 13—13 of Fig. 9;

Fig. 13A is a face view similar to Fig. 9 and showing another alternative embodiment;

Fig. 14 is a fragmentary face view of a portion of the blank utilized in producing an alternative embodiment of the invention; and Fig. 15 is a perspective of the carrier embodying such alternative form of the invention and made from the blank that is fragmentally shown in Fig. 14.

For purposes of disclosure, the invention is herein illustrated in Figs. 1 to 13 as embodied in a bottle carrier 20 that is adapted to receive six bottles B in two parallel rows of three bottles each. The carrier 20 is made from cardboard or like sheet material to embody, when erected, upstanding side walls 21A and 21B that are connected at opposite ends by the end walls 22 and 23, these end walls being made up in each instance of two foldably related panels 22A and 22B and 23A and 23B. The lower edges of the two side walls 21A and 21B are connected by bottom panels 24A and 24B that are foldably connected to the lower edges of such side walls and are foldably related to each other along a central line disposed midway between the two side walls 21A and 21B. Disposed in a plane that is midway between the two side walls 21A and 21B an upstanding handle 25 is afforded in which a finger receiving opening 26 and a cushioning flap 27 are formed in the usual manner.

The handle 25 is connected to the end walls 22 and 23 through the medium of riser members 28 and 29 that serve, as will hereinafter be described, to connect the adjacent edges of the panels that form these two end walls, and the riser members 28 and 29 extend upwardly into position between panels 25A and 25B that afford the handle 25. The riser members 28 and 29 are disposed relatively close to the end walls of the carrier and serve as bottle separating members between the end bottles in the adjacent rows.

Figures 1, 2, 3:
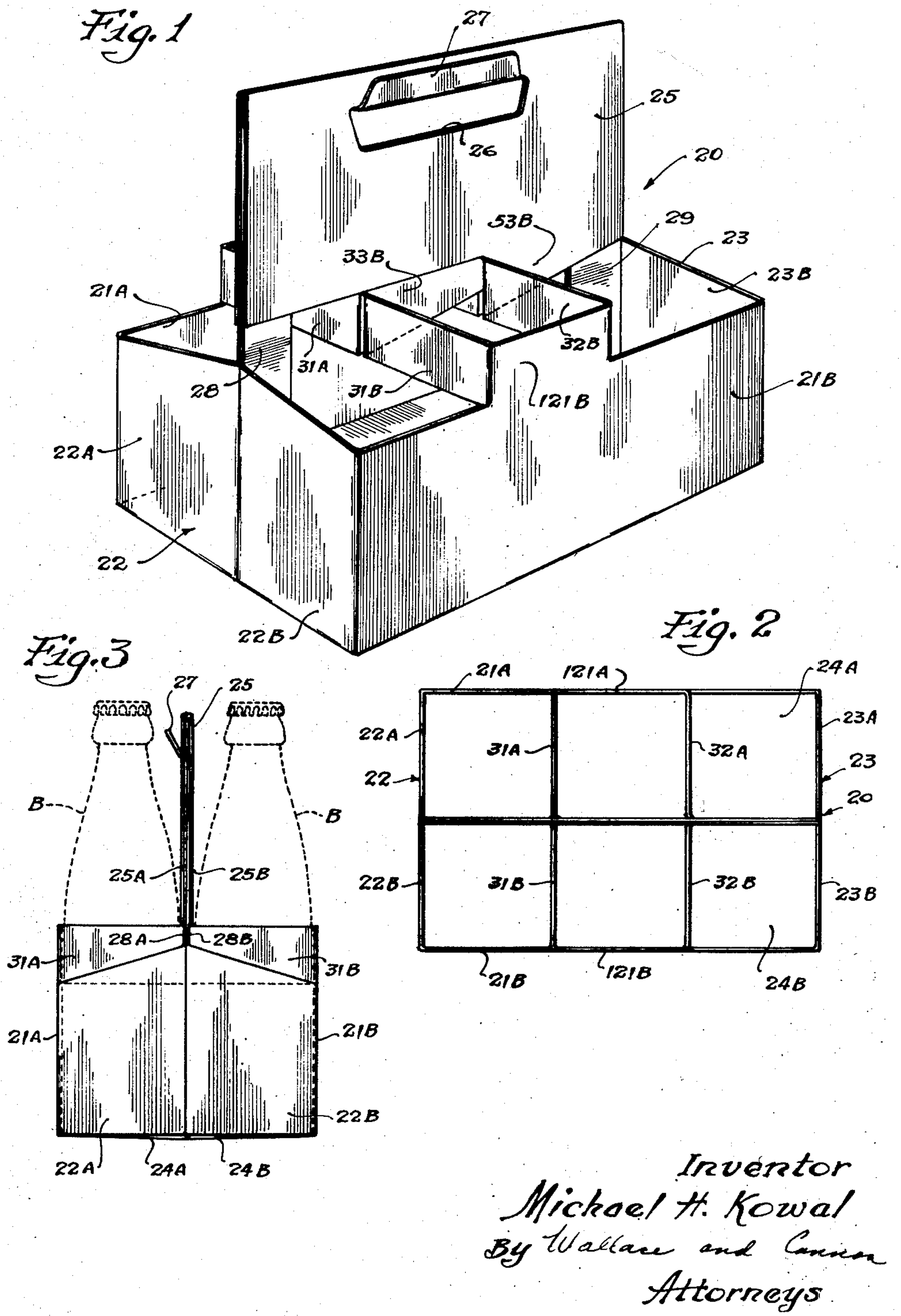
Fig. 1 is a perspective view of a bottle carrier embodying the features of the invention.
Fig. 2 is a plan view of the erected carrier.
Fig. 3 is an end view of the erected carrier showing the positions occupied by the bottles in the carrier.

The bottles in each row are separated by separating bars that extend between the side walls and the handle 25 at substantially the one-third points along the carrier, and these separating bars are pivotally connected along vertical axes to the handle 25 and the respective side walls. Thus, each of the side walls has an upward extension in the middle one-third thereof, the extension being identified as 121A on the wall 21A and as 121B on the wall 21B. Each such extension 121A and 121B is formed in an integral and uncreased relationship with respect to the related side wall, and as shown in Fig. 1 of the drawings, a separating bar 31B extends from one end edge of the extension of 121B to the related point along the lower edge of the handle 25, while a separating bar 32B extends from the other vertical end edge of the extension 121B to the related point at the lower edge of the handle 25. Similar separating bars 31A and 32A serve to connect the opposite end edges of the extension 121A with the handle 25, thereby to divide each side portion of the carrier into a row of three bottle receiving openings, each of which is defined by narrow vertical edges of vertically disposed portions of the cardboard material.

It should be observed that the separating bars 32A and 32B are pivotally connected to integral portions of the lower portion of the handle 25 as will hereinafter be described in detail, while the inner ends of the separating bars 31A and 31B are connected to joining panels 33A and 33B, respectively, that are secured in position between the handle panels 25A and 25B so that a relatively rigid mounting portion of such joining panels projects downwardly below the lower edge of the handle panels to afford the desired vertical pivotal axes for the inner ends of the separating bars 31A and 31B.

Figure 4:
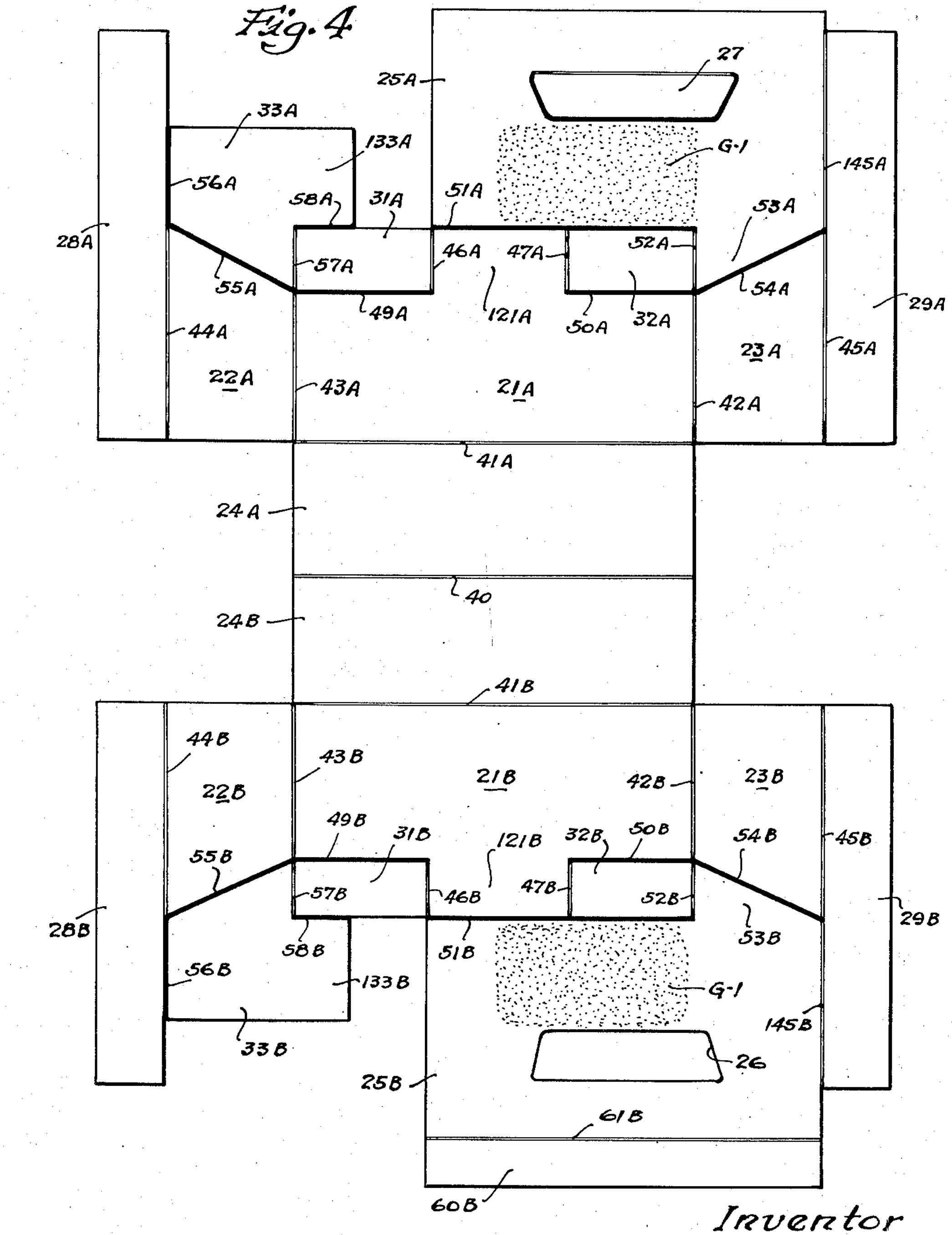
Fig. 4 is a face view of what may be termed inside face of the blank utilized in constructing the bottle carrier of Figs. 1 to 3.

In producing the carrier 20 that is shown in Fig. 1 in its erected condition, a blank is made from cardboard or like material in the form illustrated in Fig. 4 of the drawings. In this blank, the two bottom panels 24A and 24B are joined together along a central longitudinal fold line 40, and the side wall 21A is joined to the opposite edge of the bottom panel 24A along a fold line 41A. At the right hand end of the side wall 21A, the end panel 23A is joined along a fold line 42A, while at the other end of the side wall 21A, the end panel 22A is joined along a fold line 43A. The riser panels 28A and 29A are joined respectively along other edges of the end panels 22A and 23A by fold lines 44A and 45A, and it will be noted that the fold lines 42A, 43A, 44A and 45A are all parallel. The extension 121A is, of course, formed in an integral and uncreased relationship along the other or upper edge of the side wall 21A, and the separating bar 31A is connected along a vertical fold line 46A to one end of the extension 121A, while the other separating bar 32A is connected along a vertical fold line 47A to the other end of the extension of 121A. It will be observed that the separating bars 31A and 32A are, in the blank, disposed adjacent to the upper edges of the side wall 21A, and a slit 49A extended from the lower end of the fold line 46A to the upper end of the fold line 43A parallel to the lower fold line 41A serves to physically separate the adjacent edges of the side wall 21A and the separating bar 31A. Similarly, a slit 50A extends from the lower end of the fold line 47A to the upper end of the fold line 42A, thereby to physically separate the adjacent edges of the bar 32A and the side wall 21A. The handle panel 25A is in effect offset to the right in the blank from the side wall 21A, and a slit 51A extended from the upper end of the fold line 46A and to the right in Fig. 4 serves to separate the handle panel 25A from the upper edge of the extension 121A and from the upper edge of the separating bar 32A. The slit 51A terminates at the upper end of a fold line 52A which is aligned with the fold line 42A, and this fold line 52A serves to connect the other or inner end of the bar 32A to a connecting extension 53A which extends downwardly below the lower edge of the handle 25A as such edge is defined by the slit 51A. The downward extension 53A is defined at its lower edge by slit 54A which extends from the upper end of the fold line 42A to the fold line 45A. In the present instance this slit 45A extends from the adjacent end of the slit 50A in an upward angular direction, thus to define a sloping upper edge for the end panel 23A. It will be observed that the fold line 45A that connects the end panel 23A with the riser panel 29A extends upwardly as at 145A beyond the adjacent end of the slit 54A, thereby to pivotally connect the riser panel 29A with the right hand edge of the handle panel 25A as viewed in Fig. 4.

The securing panel 33A is disposed, in part, above the end panel 22A as viewed in Fig. 4, and a sloping slit 55A, corresponding to the slit 54A at the other side of the blank, extends from the upper end of the fold line 43A to the upper end of the fold line 44A, and a slit 56A extends from the left hand end of the slit 55A upwardly in alignment with the fold line 44A so as to completely sever the securing panel 33A from the riser panel 28A. The securing panel 33A thus has a downward extension portion similar to the extension 53A, and this extension is connected along a fold line 57A to the other or inner end of the separating bar 31A. As will be evident in Fig. 4, the securing panel 33A has an extended portion 133A disposed immediately above a portion of the bar 31A and a slit 58A that is parallel to the slit 49A, extends to the right from the upper end of the fold line 57A to thereby separate this extended portion 133A from the bar 31A.

On the other side of the central fold line 40, the elements are in most respects symmetrical with the elements thus far described, and the same reference characters are used with the suffix "B" in each instance. For the purpose of reinforcing the upper portion of the handle 25 above the finger receiving opening 26, a reinforcing flap 60B extends across the upper edge of the handle panel 25B and is connected thereto along a fold line 61B.

It will be noted in Fig. 4 of the drawings that the riser panels 28A and 29A are extended upwardly for a distance somewhat greater than the height of the riser panels 28B and 29B, and this affords clearance for the flap 60B when it is folded downwardly in the forming operations, as will hereinafter be described.

With the blank shown in Fig. 4 of the drawings, the successive gluing and folding operations may be performed in substantially the sequence shown comparatively by Figs. 4 to 9, inclusive, of the drawings, but for purposes of clarity of disclosure, these folding and gluing operations are shown in considerable detail and in many instances it may be desirable to perform at least certain of such folding and gluing operations concurrently rather than in sequence as illustrated in the aforesaid series of views. Thus, as the first operation in the formation of the carrier from the blank of Fig. 4, glue is applied to glue areas G–1 on the inner faces of the handle panels 25A and 25B, these areas being the ones to which the securing panels 33A and 33B are to be fastened. The first folding operation is then performed by folding the separating bars 31A and 31B along the fold lines 46A and 46B from the relationship shown in Fig. 4 to the relationship shown in Fig. 5. This locates the upper portions of the securing panels 33A and 33B in contact with the glue areas G–1 on the handle panels 25A and 25B, so that these securing panels are in effect attached to the inner faces of the handle panels. It should be noted, however, that the separating bars 31A and 31B are disposed against the unglued surfaces of the extensions 121A and 121B so that these separating bars will be free to move in the manner required in the final use or erection of the carrier. After this folding operation, glue is applied to the handle panels 25A and 25B in glue areas G–2 along the left hand edges of the handle panels as viewed in Fig. 5. The end panels 22A and 22B are then folded along the fold lines 43A and 43B, respectively, from the positions shown in Fig. 5 to the positions shown in Fig. 6. This brings the upper extending portions of the riser panels 29A and 29B into contact with the glue areas G–2 so that these riser panels in their upper portions are thereby secured to the respective handle panels.

Figures 5, 6, 7, 8:
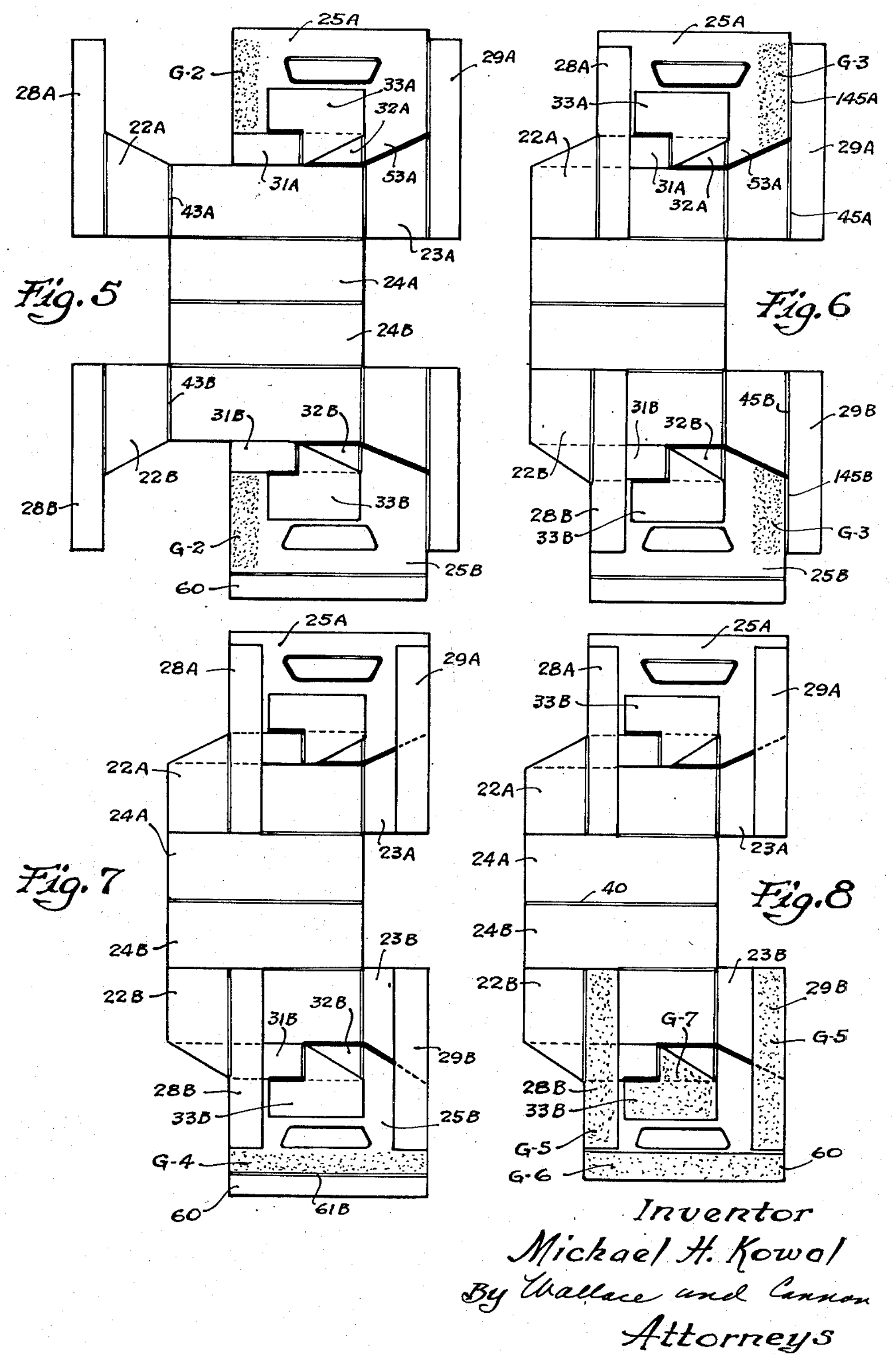

When the blank has been folded to the relationship shown in Fig. 6, glue is applied in glue areas G–3 along the right hand marginal portions of the handle panels 25A and 25B, as shown in Fig. 6 of the drawings. The riser panels 29A and 29B are then folded along the fold lines 45A and 145A as applied to the riser panel 29A, and 45B and 145B as applied to the riser panel 29B. This shifts the riser panels 29A and 29B from the relationship shown in Fig. 6 to the relationship shown in Fig. 7, and the engagement of the upper portions of these riser panels with the glue areas G–3 serves to secure these riser panels in a face to face relationship with respect to the related handle panels.

Glue is then applied to the handle panel 25B in the glue area G–4 as shown in Fig. 7, this area being along what may be termed the upper portion of this handle panel, and between the reinforcing flap 60 and the adjacent ends of the two riser panels. The reinforcing flap 60 is then folded along the fold line 61B from the position shown in Fig. 7 to the position shown in Fig. 8, so as to thereby be secured by the glue area G–4.

The blank as shown in Fig. 8 is then in condition for the final folding and gluing operation, and in preparation for this operation, glue is applied to the exposed faces of the riser panels 28B and 29B in glue areas G–5 that extend throughout the entire vertical length of these panels. Glue is also applied to the exposed face of the reinforcing flap 60 as at G–6 in Fig. 8, and is applied to the exposed face of the securing panel 33B and to the downward angular extension thereof, as at G–7. The blank is then folded along the central fold line 40 from the relationship shown in Fig. 8 to the relationship shown in Fig. 9, so that the riser panels 28A and 28B are glued together and afford a pivotal connection between the adjacent end panels 22A and 22B. In this same folding operation the riser panels 29A and 29B are secured together so that the lower portions thereof afford a pivotal connection between the end panels 23A and 23B which the upper portions serve to connect or join the vertical marginal edges of the handle panels together. Moreover, in this folding operation, the two panels 33A and 33B are brought into a face to face relation as will be evident in Fig. 13, and the glue areas G–6 and G–7 serve to secure these panels together. It will be observed in Fig. 13 that the securing panels 33A and 33B are not only glued to each other, but are disposed between the handle panels 25A and 25B to which they are secured by reason of the glue areas G–1 with which these panels 33A and 33B are engaged.

The carrier 20 in the folding operation that has just been described is completed in the collapsed form shown in Figs. 9 and 10 of the drawings, and the carrier is normally shipped and stored in this collapsed form. When the carrier is to be erected, opposing forces are applied to the side wall 21B at the left hand end thereof as viewed in Fig. 9 and to the right hand edge of the end wall 23B. This causes the carrier to move toward the relationship shown in Figs. 11 and 12, and when this movement has been continued until the center line of the handle is aligned with the center line of the side walls, the carrier will assume the fully erected relationship shown in Figs. 1 to 3 of the drawings.

In this fully erected condition, the carrier of the present invention may be disposed in the conventional cases used in the bottle industry, and the bottle loading operations may be performed readily and easily, and conventional case loading machinery may be used if desired.

In the alternative embodiment of the invention shown in Figs. 14 and 15, it is possible to eliminate the gluing and folding operation which involves the glue areas G–1 and the panels 33A and 33B of the previously described embodiment, and in many instances this may be considered to be desirable even though the erecting operation of the carton is somewhat modified. Thus the carrier of Fig. 15 is formed from a blank that is fragmentally illustrated in Fig. 14 of the drawings. This blank is in most respects similar to the blank of Fig. 4, and the same reference characters with the prefix "2" have, therefore, been employed where the elements do in fact correspond. In the blank of Fig. 14, the panel 33A is eliminated and the slit 56A is eliminated, and a connecting strip 270A is thus extended from the fold line 257A along and above the slit 255A and to the riser panel 228A. The upper edge 271A of the strip 270A is parallel to the slit 255A, and the strip 270A is connected along a vertical fold line 244A to the riser panel 228A.

Thus in the folding and gluing of the blank the first operation is the folding of the end panels 222A and 222B along the fold lines 243A and 243B, to fix the risers 228A and 228B to the handle sections in the manner hereinbefore described, and this effectually connects the strips 270A and 270B to the handle section. The succeeding operations are the same as hereinbefore described. In the erecting operation it will be apparent that the strips 270A and 270B must be maintained in planes parallel to the handle sections in order to assure proper location of the separating bars 231A and 231B, but this may readily be accomplished by grasping carrier with the thumb and forefinger in engagement with these straps, and in other respects the erecting operation is performed as hereinbefore described.

In Fig. 13A of the drawings another alternative construction is disclosed wherein additional advantageous results are attained. In this embodiment of the invention most of the elements are the same as in the structure shown in Figs. 1 to 13, and corresponding reference characters with the prefix "3" are therefore employed as to such elements. In this embodiment, the upper edges 381B and 382B of the ends panels 322B and 323B and 382B of the end panels 322B and 323B are formed with a greater slope, and a correspondingly increased slope is afforded on the other end panels, and with this arrangement the upper edges of the end panels meet the riser panels, as 328B and 329B at points that are above the line or edge as 351B that defines the lower edges of the handle panels. With respect to the riser panels 328B and 328A, this imparts a greatly increased assurance against tearing of such riser panels, since the adjacent lower corner of the handle panels engages and reenforces these riser panels at their points of juncture with the upper edges of the adjacent end panels. As shown in Fig. 16, the riser panels are somewhat shorter, as indicated at 383B, and by this arrangement economy of material may be effected when this is desired.

From the foregoing description it will be apparent that the present invention enables a preformed collapsible bottle carrier to be made from cardboard and like materials in a simple and economical manner, and the bottle carrier of the present invention is of such a character that it is rugged in its structural characteristics despite the simplicity of its form. It will also be evident that the present bottle carrier eliminates the necessity for angular bottle separating webs and for the use of a two-piece construction in attaining horizontally extending bottle separating webs. Another desirable characteristic that is attained in the present bottle carrier through structure of a simple character is the provision of a complete enclosure of the bottles, it being noted that the present carrier has end walls that extend entirely to the bottoms of the bottles.

Under and in accordance with the present invention, the bottle carriers attain the desired weight transmitting action only through structural elements that are of unusual cross section or size, and this is attained in a simple manner which does not objectionally add to the cost of the carrier.

Thus while I have illustrated and described the preferred embodiments of my invention, it is to be understood that they are capable of variation and modification and I therefore do not wish to be limited to the precise details set forth, but desire to avail myself of such changes and alterations as fall within the purview of the following claims.

I claim:

1. In a pre-formed collapsible bottle carrier made from cardboard or like material, a pair of bottom panels joined together along a central longitudinal fold line, a pair of side walls joined at their lower edges along fold lines to the other edges of the respective bottom panels, two pairs of end panels disposed at opposite ends of said side walls and pivotally connected to the end gether in face to face relation to afford pivotal connected to the other edges of said end panels, the riser panels at each end being secured togther in face to face relation to afford pivotal connections between the end panels at the respective ends of the carrier, a pair of handle panels disposed on opposite side faces of the riser panels and rigidly secured to said riser panels and to each other to afford a weight transmitting connection between said handle panels and said end panels, said side walls having upward extensions formed thereon throughout the middle one-third thereof, separating bars pivoted to opposite end edges of said upward extensions, said separating bars extending in parallel relation to points located below the one-third points of said handle panels, and extensions fixedly connected to said handle panels and affording vertical edges located at the one-third points along and below the lower edge of said handle panels, said extensions being connected along vertical fold lines at said vertical edges to the other ends of said separating bars.

2. In a pre-formed collapsible bottle carrier made from cardboard or like material, a pair of bottom panels joined together along a central longitudinal fold line, a pair of side walls joined at their lower edges along fold lines to the other edges of the respective bottom panels, two pairs of end panels disposed at opposite ends of said side walls and pivotally connected to the end edges of such side walls, riser panels pivotally connected to the other edges of the respective end panels, the two riser panels at each end being secured together in face to face relation and projecting inwardly from their end panels to afford pivotal connections between the end panels at the respective ends of the carrier, a pair of handle panels disposed on opposite side faces of the riser panels and rigidly secured to said riser panels and to each other to afford a weight transmitting connection through said riser panels between said handle panels and said end panels, said side walls having upward extensions formed thereon throughout the middle one-third thereof, separating bars pivoted to opposite end edges of said upward extensions, said separating bars extending in parallel relation to points located below the one-third points of said handle panels, and downward extensions rigidly related to said handle panels and disposed below the lower edge of said handle panels, said downward extensions being connected along vertical fold lines to the other ends of said separating bars.

3. In a pre-formed collapsible bottle carrier made from a unitary blank of cardboard or like material creased, folded and secured together to provide a pair of bottom panels joined together along a central longitudinal fold line, a pair of side walls joined at their lower edges along fold lines to the other edges of the respective bottom panels, two pairs of end panels disposed at opposite ends of said side walls and pivotally connected to the end edges of such side walls, riser panels pivotally connected to the other edges of said end panels, the riser panels at each end being secured together in face to face relation to afford pivotal connections between the end panels at the respective ends of the carrier, a pair of handle panels disposed on opposite side faces of the riser panels and rigidly secured to said riser panels and to each other to afford a weight transmitting connection between said handle panels and said end panels, said side walls having upward extensions formed thereon throughout the middle one-third thereof, separating bars pivoted to opposite end edges of said upward extensions, said separating bars extending in parallel relation to points located below the one-third points of said handle panels, and means fixedly related to said handle panels and connected along vertical fold lines to the other ends of said separating bars at points disposed below the lower edge of said handle panels.

4. In a pre-formed collapsible bottle carrier made from cardboard or like material, a pair of bottom panels joined together along a central longitudinal fold line, a pair of side walls joined at their lower edges along fold lines to the other edges of the respective bottom panels, two pairs of end panels disposed at opposite ends of said side walls and pivotally connected to the end edges of such side walls, riser panels pivotally connected to the other edges of said end panels and extended inwardly therefrom, the riser panels at each end being secured together in face to face relation to afford pivotal connections between the end panels at the respective ends of the carrier, a pair of handle panels disposed on opposite side faces of the riser panels and rigidly secured to said riser panels and to each other to afford a weight transmitting connection between said handle panels and said end panels, said side walls having upward extensions formed thereon affording vertical securing edges disposed above and at the one-third points along the upper edges thereof, separating bars pivoted along fold lines on said vertical edges of said upward extensions, said separating bars extending in parallel relation to points located below the one-third points of said handle panels, and extensions fixedly related to said handle panels and pivotally connected along vertical fold lines to the other ends of said separating bars at the one-third points along said handle panels.

5. In a pre-formed collapsible bottle carrier, a pair of rectangular bottom panels foldably connected to each other along a central fold line, side walls connected at their lower edges along their fold lines to the other edges of the respective bottom panels, a pair of end panels at one end of said carrier pivoted along vertical fold lines to the adjacent ends of said side walls, riser panels pivotally connected along the other edges of the respective end panels and extended for a substantial distance beyond the upper edges of said end panels, said riser panels being extended inwardly in face to face relation and being secured together to pivotally connect said end panels, a second pair of end panels pivotally connected along vertical fold lines to the other end edges of the respective side walls, a second pair of riser panels pivotally connected to the other edges of the respective end panels and being extended inwardly and secured together in face to face relation, said second pair of riser panels extending upwardly for a substantial distance above the upper edge of said second pair of end panels, a pair of handle panels pivotally connected along fold lines to the upwardly extending portions of said second pair of riser panels and being disposed against and secured to the upwardly extending portions of said second pair of riser panels, said handle panels at their other ends being disposed against opposite faces of the first mentioned pair of riser panels and being secured thereto, said side walls having upward extensions in the middle one-third thereof, a pair of separating bars pivotally connected to and extended horizontally from the end edges of the respective extensions at one end thereof, said separating bars having securing panels at the other ends thereof pivoted thereto along vertical lines and extended upwardly between and secured to said handle panels, a second pair of separating bars pivotally connected along vertical fold lines to the other end edges of the respective upward extensions, and integral downward extensions formed on said handle panels and pivotally connected along vertical fold lines to the other ends of the second pair of separating bars.

6. In a pre-formed collapsible bottle carrier, a pair of rectangular bottom panels foldably connected to each other along a central fold line, side walls connected at their lower edges along their fold lines to the other edges of the respective bottom panels, a pair of end panels at one end of said carrier pivoted along vertical fold lines to the adjacent ends of said side walls, riser panels pivotally connected along the other edges of the respective end panels and extended for a substantial distance beyond the upper edges of said end panels, said riser panels being extended inwardly in face to face relation and being secured together to pivotally connect said end panels, a second pair of end panels pivotally connected along vertical fold lines to the other end edges of the respective side walls, a second pair of riser panels pivotally connected to the other edges of the respective end panels and being extended inwardly and secured together in face to face relation, said second pair of riser panels extending upwardly for a substanial distance above the upper edge of said second pair of end panels, a pair of handle panels pivotally connected along fold lines to the upwardly extending portions of said second pair of riser panels and being disposed against and secured to the upwardly extending portions of said second pair of riser panels, said handle panels at their other ends being disposed against opposite faces of the first mentioned pair of riser panels and being secured thereto, said side walls having upward extensions affording vertical end edges disposed at the one-third points along said side walls, a pair of separating bars pivotally connected to and extended horizontally from said vertical end edges of the respective extensions at one of the one-third points, said separating bars having securing panels at the other ends thereof pivoted thereto along vertical fold lines and extended upwardly between and secured to said handle panels, a second pair of separating bars pivotally connected along vertical fold lines to the other vertical end edges of the respective upward extensions, and integral downward extensions formed on said handle panels and pivotally connected along vertical fold lines to the other ends of the second pair of separating bars.

7. In a pre-formed collapsible bottle carrier made from cardboard or like material, a pair of bottom panels joined together along a central longitudinal fold line, a pair of side walls joined at their lower edges along fold lines to the other edges of the respective bottom panels, two pairs of end panels disposed at opposite ends of said side walls and pivotally connected to the end edges of such side walls, riser panels pivotally connected to the other edges of the respective end panels, the two riser panels at each end being secured together in face to face relation and projecting inwardly from their end panels to afford pivotal connections between the end panels at the respective ends of the carrier, said riser panels having integral upper portions extended substantially above the upper edges of said end panels, a pair of handle panels disposed on opposite side faces of the upper portions of the riser panels and rigidly secured to said riser panels and to each other to afford a weight transmitting connection through said riser panels between said handle panels and said end panels, said side walls having upward extensions formed thereon affording vertical edges disposed at the one-third points along said side walls, separating bars pivoted to said vertical edges of said upward extensions, said separating bars extending in parallel relation to points located below the one-third points of said handle panels, and downward extensions in fixed relation to said handle panels and affording vertical pivot lines disposed below the lower edge of said handle panels, said downward extensions being connected at said pivot lines along vertical fold lines to the other ends of said separating bars.

8. In a pre-formed collapsible bottle carrier made from cardboard or like material, a pair of bottom panels joined together along a central longitudinal fold line, a pair of side walls joined at their lower edges along fold lines to the other edges of the respective bottom panels, two pairs of end panels disposed at opposite ends of said side walls and pivotally connected to the end edges of such side walls, riser panels pivotally connected to the other edges of said end panels, the riser panels at each end being secured together in face to face relation to afford pivotal connections between the end panels at the respective ends of the carrier, a pair of handle panels disposed on opposite side faces of the riser panels and rigidly secured to said riser panels and to each other to afford a weight transmitting connection between said handle panels and said end panels, said end walls having angular and upwardly sloping upper edges terminating at one end of said carrier at points above the lower edges of said handle panels, said side walls having upward extensions formed thereon throughout the middle one-third thereof, separating bars pivoted to opposite end edges of said upward extensions, said separating bars extending in parallel relation to points located below the one-third points of said handle panels, and extensions fixedly connected to said handle panels and affording vertical edges located at the one-third points along and below the lower edge of said handle panels, said extensions being connected along vertical fold lines at said vertical edges to the other ends of said separating bars.

9. A one-piece open-topped compartmented bottle carrier formed from cardboard or like material and comprising, when erected, bottom and side walls, center and cross partitions, and end walls each comprised of two panels interconnected at their inner ends along vertically disposed fold lines, the end and side walls and the partitions defining six compartments disposed in two rows of three each, portions of the center partition being formed by inwardly disposed extensions of the panels at opposite ends of the carrier, an upward extension on the top edge of each side wall extending the width of the adjacent center compartment and projecting upwardly beyond the level of the top edge of the side walls of each of the adjacent end compartments, and webs integral with said extensions and respectively joined to the ends thereof along vertically disposed fold lines and extended inwardly of the carrier and forming the cross partitions, and other webs integrally joined to the inner ends of the first named webs and forming part of the center partition and secured thereto and effective to retain the first named webs in position to afford the cross partitions.

References Cited in the file of this patent

UNITED STATES PATENTS

| Number | Name | Date |
|---|---|---|
| 2,163,290 | Powell | June 20, 1939 |
| 2,322,396 | Slevin | June 22, 1943 |
| 2,354,528 | Lowey et al. | July 25, 1944 |
| 2,371,471 | Rothstein | Mar. 13, 1945 |
| 2,418,350 | Holy | Apr. 1, 1947 |
| 2,458,281 | Lupton | Jan. 4, 1949 |
| 2,537,615 | Arneson | Jan. 9, 1951 |